US012748484B2

(12) United States Patent
Hwang et al.

(10) Patent No.: US 12,748,484 B2
(45) Date of Patent: Sep. 29, 2026

(54) SIGNAGE DISPLAY DEVICE PROVIDED IN INTERACTIVE SWIMMING POOL

(71) Applicant: LG ELECTRONICS INC., Seoul (KR)

(72) Inventors: Hyokune Hwang, Seoul (KR); Seungjin Jang, Seoul (KR); Namyoung Kim, Seoul (KR); Yongbeom Ma, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/112,718

(22) PCT Filed: Sep. 30, 2022

(86) PCT No.: PCT/KR2022/014786

§ 371 (c)(1),
(2) Date: Mar. 18, 2025

(87) PCT Pub. No.: WO2024/071487

PCT Pub. Date: Apr. 4, 2024

(65) Prior Publication Data

US 2026/0099192 A1 Apr. 9, 2026

(51) Int. Cl.
*G06F 3/01* (2006.01)
*G06F 3/14* (2006.01)

(52) U.S. Cl.
CPC ............ *G06F 3/011* (2013.01); *G06F 3/1446* (2013.01)

(58) Field of Classification Search
CPC ............................... G06F 3/011; G06F 3/1446
See application file for complete search history.

(56) References Cited

U.S. PATENT DOCUMENTS

| | | | | |
|---|---|---|---|---|
| 2014/0354905 | A1 | 12/2014 | Kitchens et al. | |
| 2015/0209614 | A1* | 7/2015 | Lee | A63B 31/00 482/8 |
| 2016/0306603 | A1* | 10/2016 | Nadeson | G06F 3/011 |
| 2017/0034888 | A1 | 2/2017 | Verma | |
| 2017/0333799 | A1* | 11/2017 | Park | E04H 4/00 |
| 2020/0394804 | A1* | 12/2020 | Barton | G06T 7/80 |
| 2021/0264572 | A1* | 8/2021 | Hrabe | G06T 5/92 |
| 2023/0018657 | A1* | 1/2023 | Komatsu | H04N 1/02815 |
| 2024/0153109 | A1* | 5/2024 | Konakalla | G06V 10/70 |

FOREIGN PATENT DOCUMENTS

KR 10-2020-0109747 A 9/2020

* cited by examiner

*Primary Examiner* — Nathan P Brittingham
(74) *Attorney, Agent, or Firm* — Birch, Stewart, Kolasch & Birch, LLP

(57) ABSTRACT

The present invention relates to a signage display device provided in an interactive swimming pool, the signage display device comprising: a display having a plurality of signage display modules; a plurality of sensors for sensing a user located in a swimming pool region formed above the signage display modules; and a processor for detecting the user located in the swimming pool region by receiving signals acquired by the plurality of sensors, wherein the processor generates screen information related to the detected user on the basis of the detection result and controls so that the generated screen information is outputted on the signage display modules.

9 Claims, 12 Drawing Sheets

(a)

(b)

(c)

(a)

(b)

(a)

(b)

(a)

(b)

(c)

SIGNAGE DISPLAY DEVICE PROVIDED IN INTERACTIVE SWIMMING POOL

CROSS REFERENCE TO RELATED APPLICATIONS

This application is the National Phase of PCT International Application No. PCT/KR2022/014786, filed on Sep. 30, 2022, which is hereby expressly incorporated by reference into the present application.

TECHNICAL FIELD

The present disclosure relates to a signage display device provided in an interactive swimming pool. More specifically, the present disclosure relates to a signage display device that installs a signage-type display on a bottom surface of a swimming pool, detects a user inside the swimming pool using an RGB illuminance sensor disposed between display modules, and provides screen information to enhance fun and safety for the user, and a control method thereof.

BACKGROUND ART

As a conventional technology for detecting the position of an object touching a display in a display device, United States Patent Application No. US2010-0238138A1 proposes a method comprising an infrared light-emitting device. Specifically, the position of an object may be detected by sensing reflective light that is emitted from an infrared light-emitting device, reflected on the object, and then received again.

In addition, conventional technologies for detecting an object on a mobile terminal or large display use an active method in which the object is provided with a light-emitting element or a light-receiving element, or a method using infrared light to avoid interference with display light.

The present disclosure is a technology for detecting a user inside a swimming pool by installing a display on a bottom surface of a swimming pool, but in the case of conventionally known infrared light, or the like, there is a problem in that it is difficult to use it to detect an object in the swimming pool because it is mostly absorbed by water.

DISCLOSURE OF INVENTION

Technical Problem

The present disclosure aims to solve the foregoing problems and other problems, and an aspect of the present disclosure is to provide a signage display device that installs a signage-type display on a bottom surface of a swimming pool, detects a user inside the swimming pool using an RGB illuminance sensor disposed between display modules, and provides screen information to enhance fun and safety for the user, and a control method thereof.

Solution to Problem

In order to achieve the foregoing or other objectives, according to an aspect of the present disclosure, a signage display device according to an embodiment of the present disclosure may include a display having a plurality of signage display modules, a plurality of sensors that sense a user located in a swimming pool area formed above the signage display modules, and a processor that receives signals acquired by the plurality of sensors to detect a user located in the swimming pool area.

In one embodiment, the processor may generate screen information associated with the detected user based on a result of the detection, and control the generated screen information to be output to the signage display module.

In one embodiment, each of the plurality of sensors may be an RGB

In one embodiment, signals acquired by the plurality of sensors may include sunlight emitted from the sun and then received and an RGB reflective light reflected on a user body part and then received, wherein the processor receives the signals acquired by the plurality of sensors, removes a DC component associated with the sunlight to extract an RGB reflective light reflected on a swimmer body part and then received, and detects a user based on an intensity of the extracted RGB reflective light.

In one embodiment, each of the plurality of sensors may be disposed between the plurality of signage display modules, wherein the processor receives first and second signals acquired by first and second sensors among the plurality of sensors to extract first and second RGB reflective lights, and detect a user based on intensities of the extracted first and second reflective lights.

In one embodiment, the processor may determine, when an intensity of at least one of the extracted first and second reflective lights is above a first threshold and below a second threshold, that the user is located in a sensing area of the first and second sensors, and compare intensities of the extracted first and second reflective lights to determine a first swimming pool area where the user is located, wherein the first swimming pool area is at least one of swimming pool areas formed above one or more display modules arranged adjacent to the first and second sensors.

In one embodiment, the processor may generate screen information associated with the user that is output to a signage display module corresponding to the first swimming pool area, and the generated screen information may be generated differently from screen information output to a signage display module corresponding to a second swimming pool area, wherein the second swimming pool area is at least one area excluding the first swimming pool area in an entire swimming pool area.

In one embodiment, the processor may determine, when an intensity of at least one of the extracted first and second reflective lights is above the second threshold, that there are a plurality of users in the sensing area of the first and second sensors, further calculate a user density of a swimming pool area formed above a signage display module disposed between the first and second sensors, and generate screen information to be output to the signage display module based on the calculated user density.

In one embodiment, each of the plurality of sensors may be disposed between pixels of the signage display module, wherein the processor extracts a RGB reflective light for each of a plurality of signals acquired by the plurality of sensors, and detects a user based on an intensity of the RGB reflective light extracted for each of the plurality of signals.

In one embodiment, the processor may determine, when a sum of the intensities of the extracted RGB reflective lights is above a first threshold and below a second threshold, that a user is present in a swimming pool area formed above the signage display module, and generate screen information to be output to the signage display module based on a result of the determination.

In one embodiment, the processor may determine, when the sum of the intensities of the extracted RGB reflective lights is above the second threshold, that there are a plurality of users in a swimming pool area formed above the signage display module to further calculate a user density of the swimming pool area, and generate screen information to be output to the signage display module based on the calculated user density.

In one embodiment, the device may further include a communication module operatively coupled to the processor, wherein the processor controls the generated screen information to be transmitted to a peripheral device through the communication module, and wherein the peripheral device is at least one of electronic devices that control lighting, music, and waves within a swimming pool.

In one embodiment, the device may further include a second display, wherein the processor controls the generated swimming pool screen information to be output to the second display.

In order to achieve the foregoing or other objectives, according to an aspect of the present disclosure, a method of controlling a signage display device provided in an interactive swimming pool may include sensing a user located in a swimming pool area formed above a signage display module by a plurality of sensors to acquire a signal, receiving the acquired signal to detect a user located in the swimming pool area, generating screen information associated with the detected user based on a result of the detection, and outputting the generated screen information to the signage display module.

In one embodiment, the receiving of the acquired signal to detect a user located in the swimming pool area may include receiving first and second signals acquired by first and second sensors among the plurality of sensors, removing a DC component associated with sunlight from the received first and second signals to extract first and second RGB reflective lights reflected on a swimmer body part and then received, and detecting a user based on In one embodiment, the detecting of a user based on intensities of the extracted first and second RGB reflective lights may include determining, when an intensity of at least one of the extracted first and second reflective lights is above a first threshold and below a second threshold, that the user is located in a sensing area of the first and second sensors, and comparing intensities of the extracted first and second reflective lights to determine a first swimming pool area where the user is located, and determining, when an intensity of at least one of the extracted first and second reflective lights is above the second threshold, that there are a plurality of users in the sensing area of the first and second sensors, and calculating a user density of a swimming pool area formed above a signage display module disposed between the first and second sensors.

Advantageous Effects of Invention

According to an embodiment of the present disclosure, the following effects may be achieved.

According to at least one of embodiments of the present disclosure, the present disclosure has the effect of providing a signage display device which installs a signage-type display on the bottom surface of a swimming pool, detects a user inside the swimming pool using an RGB illuminance sensor disposed between display modules, and provides screen information to enhance fun and safety for the user, and a control method thereof.

MODE FOR THE INVENTION

Figure 1:
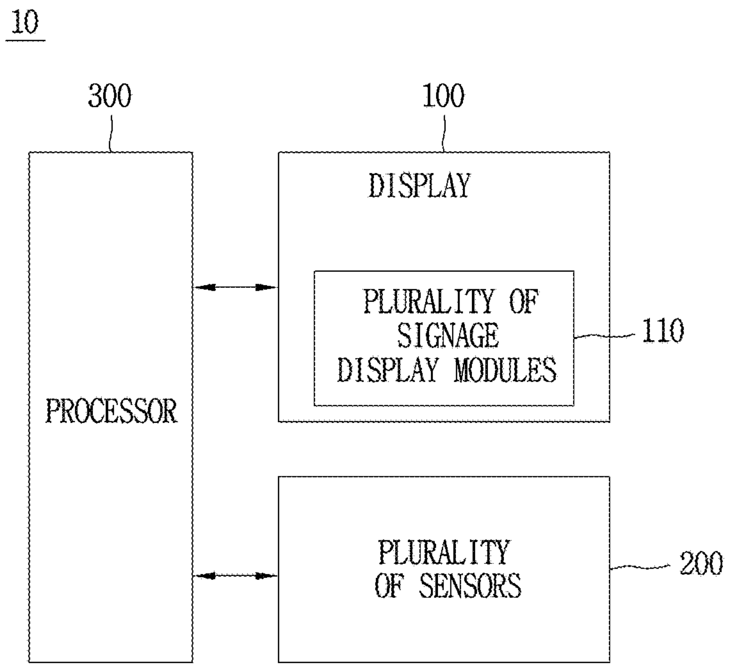
FIG. 1 is an internal block diagram of a signage display device according to one embodiment of the present disclosure.

Hereinafter, description for disclosed in this specification will be described in detail with reference to the accompanying drawings, wherein the same or similar elements will be denoted by the same reference numerals independent of the drawing numerals, and overlapping description of the same or similar elements will be omitted. The suffixes "module" and "unit" used for elements in the following description are used only to simplify the disclosure, and therefore do not have meanings or functions that distinguish elements from each other in themselves. In describing embodiments disclosed herein, moreover, the detailed description will be omitted when specific description for publicly known technologies to which the disclosure pertains is determined to obscure the gist of the present disclosure. Furthermore, the accompanying drawings are provided only for a better understanding of the embodiments disclosed herein and are not intended to limit technical concepts disclosed herein, and therefore, it should be understood that the accompanying drawings include all modifications, equivalents and substitutes within the concept and technical scope of the present disclosure.

The terms including an ordinal number such as first, second, and the like may be used to describe various elements, but the elements should not be limited by those terms. The terms are used merely for the purpose to distinguish one element from another element.

It should be understood that when an element is referred to as being "connected to" or "coupled to" another element, the element may be directly connected to or coupled to the other element or intervening elements may also be present. On the contrary, it should be understood that when it is mentioned herein that an element is "directly connected" or "directly coupled" to another element, a still another element may not be present therebetween.

A singular representation may include a plural representation, unless the context clearly indicates otherwise.

The terms "include" or "have" used herein should be understood that they are intended to indicate the presence of a feature, a number, a step, an operation, an element, a component or a combination thereof disclosed in the specification, and it may also be understood that the presence or additional possibility of one or more other features, numbers, steps, operations, elements, components or combinations thereof are not excluded in advance.

An electronic device described in this specification may be applied to a stationary terminal such as a digital TV, a desktop computer, a kiosk, a digital signage, and the like. In particular, the electronic device described in this specification may be applied to a non-contact display device, that is, an image display device, such as a kiosk, a digital signage, and the like.

Hereinafter, a configuration of a signage display device provided in an interactive swimming pool according to an embodiment of the present disclosure will be described in detail with reference to the accompanying drawings.

Referring to FIG. 1, a signage display device 10 according to an embodiment of the present disclosure may include a display 100 having a plurality of signage display modules 110, a plurality of sensors 200, and a processor 300 electrically connected to the display 100 and the plurality of sensors 200.

The elements shown in FIG. 1 are not essential for implementing the signage display device 10, and thus the signage display device 10 described in this specification may have more or fewer elements than those listed above.

Figure 2:
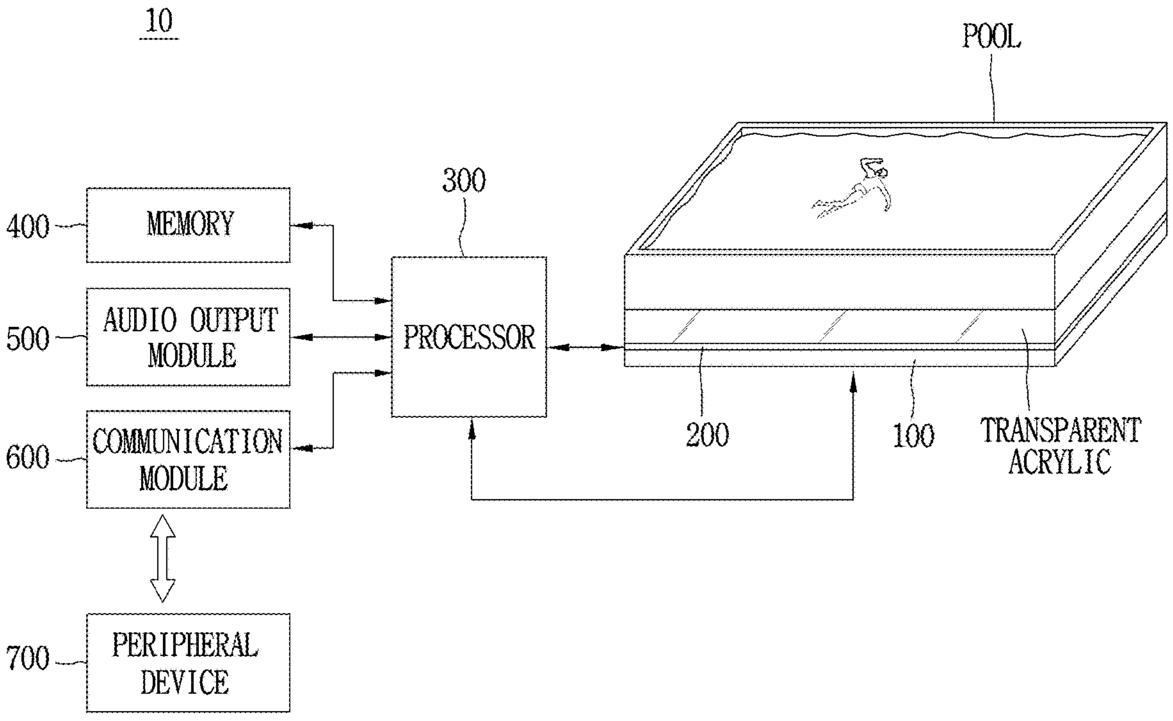
FIG. 2 is a conceptual diagram showing a configuration of a signage display device according to one embodiment of the present disclosure.

FIG. 2 is a conceptual diagram showing a configuration of the signage display device 10 according to an embodiment of the present disclosure.

Referring to FIG. 2, a signage display device 10 according to an embodiment of the present disclosure may include a display 100 including a plurality of signage display modules arranged on a bottom surface of a swimming pool, a plurality of sensors 200, and a processor 300.

In addition, the signage display device 10 according to an embodiment of the present disclosure may further include a memory 400, an audio output module 500, and a communication module 600, which are operatively coupled to the processor 300.

In addition, the processor 300 according to an embodiment of the present disclosure may control a peripheral device 700 within the swimming pool through the communication module 600. Specifically, the peripheral device 700 may denote one or more electronic devices that control lighting, music, and waves within the swimming pool, but is not limited thereto.

Meanwhile, the communication module 600 included in the signage display device 10 according to an embodiment of the present disclosure may include one or more modules that allow wireless communication between the signage display device 10 and at least one peripheral device, or between an external server, but is not limited thereto.

In addition, the communication module 600 may include one or more modules that connect the signage display device 10 to one or more networks.

The module included in the communication module 600 may include a wireless Internet module. The wireless Internet module refers to a module for wireless Internet access, which may be built into or external to the signage display device 10. The wireless Internet module may be configured to transmit and receive a wireless signal in a communication network according to wireless Internet technologies.

The wireless Internet technologies may include, for example, wireless LAN (WLAN), wireless-fidelity (Wi-Fi), wireless-fidelity direct (Wi-Fi Direct), digital living network alliance (DLNA), wireless broadband (WiBro), worldwide interoperability for microwave access (WiMAX), high speed downlink packet access (HSDPA), high speed uplink packet access (HSUPA), long term evolution (LTE), long term evolution-advanced (LTE-A), and the like, and may also include Internet technologies not listed above. Furthermore, data may be transmitted and received according to at least one wireless Internet technology in a range not listed above.

In addition, the module included in the communication module 600 may include a short-range communication module. The short-range communication module is configured to facilitate short-range communication, which can support short-range communication using at least one of Bluetooth™, radio frequency identification (RFID), infrared data association (IrDA), ultra wideband (UWB), ZigBee, near field communication (NFC), wireless-fidelity (Wi-Fi), Wi-Fi direct, wireless universal serial bus (wireless USB) technologies, and the like. The short-range communication module may support wireless communication between the signage display device 10 and at least one other In general, an illuminance sensor is a sensor that measures an ambient brightness using a characteristic of changing an internal resistance value depending on an intensity of the received light. Additionally, an RGB illuminance sensor may be defined as a sensor that measures a color density of ambient light using a characteristic of changing an internal resistance value depending on an intensity of the received RGB light.

Meanwhile, a signage display generally has a characteristic of emitting RGB light on its own when the display panel is driven.

Hereinafter, a signage display device according to an embodiment of the present disclosure will be described in detail regarding a process of detecting a user located above a signage display in consideration of characteristics of the RGB illuminance sensor and the signage display described above.

Figure 3A:
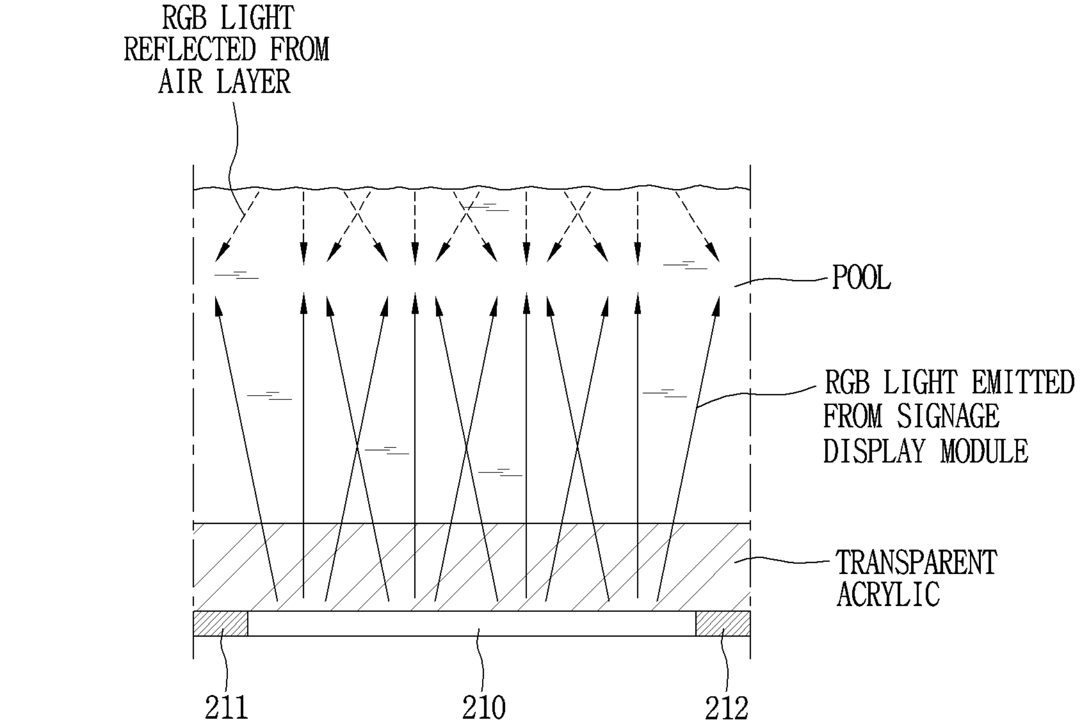
FIGS. 3A and 3B are conceptual diagrams showing an embodiment in which RGB light emitted from a signage display module passes through an air layer or is reflected on a user and then received.

FIG. 3A shows an embodiment in which RGB light emitted from a signage display module 210 passes through water to be emitted into an air layer when there is no user inside the pool.

In general, RGB light may be transmitted above 90% through water, and transmitted above 96% where it meets the air layer. Therefore, as shown in FIG. 3A, when there is no user in the pool, a small amount of RGB light below 4% may be reflected from the water and the air layer and then received again into the pool. In this case, intensities of signals detected by one or more RGB illuminance sensors 211, 212 disposed adjacent to the signage display module 210 may be very small.

Figure 3B:
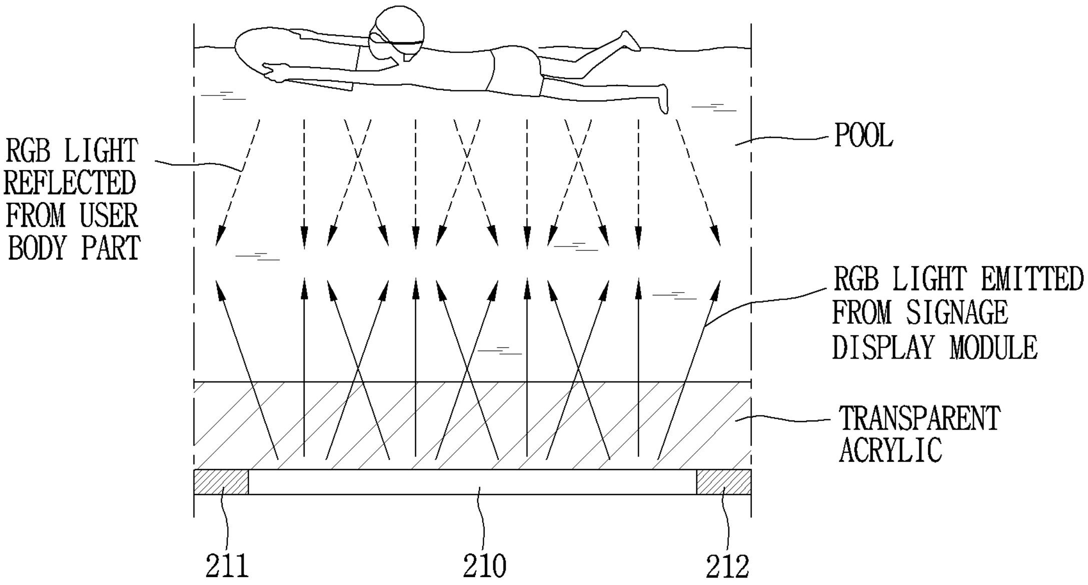

Meanwhile, FIG. 3B shows an embodiment in which RGB light emitted from the signage display module 210 is reflected by a user body part and received again into the pool when there is one or more users inside the pool.

RGB light reflected on a user body part and received again into the pool may be detected by one or more RGB illuminance sensors 211, 212 disposed adjacent to the signage display module 210. In this case, when the intensities of the signals detected by one or more RGB illuminance sensors 211, 212 are greater than a first threshold at a predetermined level, it may be determined that there is at least one user in a partial area of the swimming pool where the RGB illuminance sensors 211, 212 are located.

In addition, when the intensities of the signals detected by one or more RGB illuminance sensors 211, 212 are greater than a second threshold at a predetermined level, it may be determined that there are a plurality of users in a partial area of the swimming pool where the RGB illuminance sensors 211, 212 are located.

Meanwhile, the first threshold may be predefined as a threshold that can determine that an intensity of a signal acquired by the RGB illuminance sensor is an intensity of reflective light reflected on at least one user body part and then received. In addition, the foregoing second threshold, which is a value greater than the first threshold, may be predefined as a threshold at which an intensity of a signal acquired by the RGB illuminance sensor can be determined to be an intensity of reflective light reflected on at least two or more user body parts and then received.

Meanwhile, in general, a human body may have a high Lambertian reflectance. Therefore, the intensity of RGB light reflected back on a human body may be increased rapidly, and is very easy to detect by one or more RGB illuminance sensors.

Hereinafter, a process of determining, by the processor 300 according to an embodiment of the present disclosure, the presence or absence of a user by measuring the intensity of RGB light reflected from a user body part based on a signal acquired by one or more RGB illuminance sensors will be described in detail.

As described above, a signage display has a characteristic of emitting RGB light on its own when the display panel is driven. In one embodiment, a swimming pool installed outdoors may be considered. In this case, a signal received toward the signage display disposed on a bottom surface of the swimming pool may include not only RGB light emitted from the signage display itself and reflected back on a user body, but also sunlight emitted from the sun. That is, an intensity of a signal acquired by the RGB illuminance sensor disposed inside the display may include an intensity of RGB light reflected on a user and then received and an intensity of sunlight.

Meanwhile, in general, RGB light emitted from a signage display is an AC signal component, while sunlight emitted from the sun has a characteristic of being detected as a DC signal component by an RGB illuminance sensor.

Therefore, the present disclosure proposes a method of measuring only an intensity of RGB light reflected on a user's body part and then received by removing the DC component associated with sunlight from an entire signal acquired by the RGB illuminance sensor.

Figure 4:
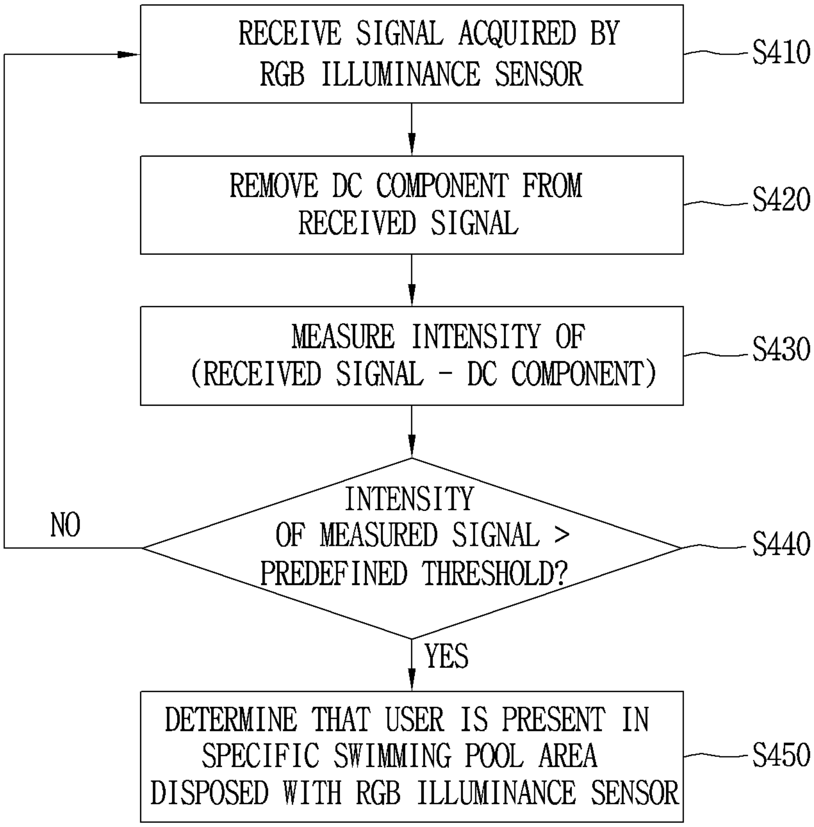
FIG. 4 is a flowchart showing a control method of a processor that extracts RGB reflective light reflected on a user and then received to determine whether the user is present.

FIG. 4 is a flowchart showing a control method of a processor that determines the presence or absence of a user by extracting RGB light reflected on a user body part and then received from an entire signal acquired by the RGB illuminance sensor as described above.

The processor 300 according to an embodiment of the present disclosure may first perform receiving a signal acquired by the RGB illuminance sensor (S410), and removing a DC component from the received signal (S420). Next, measuring an intensity of a remaining signal that has removed the DC component from the received signal (S430) and comparing an intensity of the measured signal with a preset threshold (S440) may be performed. Next, when the intensity of the measured signal is greater than a preset threshold, determining that a user is present in a specific area of a swimming pool where the RGB illuminance sensor is disposed (S450) may be performed.

Meanwhile, as a method for removing the DC component from an entire detected signal according to an embodiment of the present disclosure, an AC-coupling method using a conventionally well-known fast Fourier transform (FFT) may be applied, but is not limited thereto.

Hereinafter, an embodiment of removing a DC component from an entire detected signal will be described with reference to FIG. 5.

In general, fast Fourier transform (FFT) is an algorithm that converts a signal waveform in a time domain into a signal waveform in a frequency domain. That is, it converts a signal into individual spectral components to provide frequency information on the signal.

Figure 5:
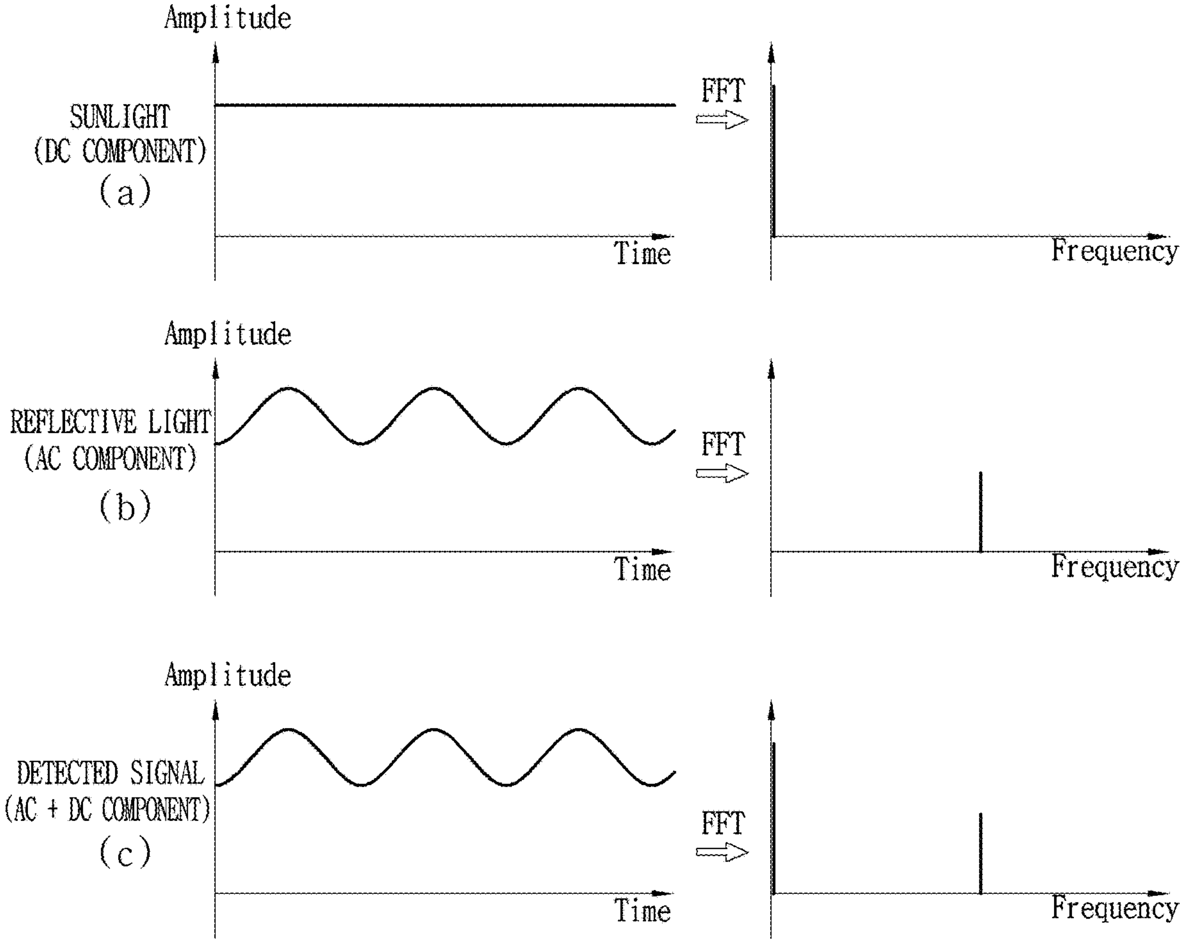
FIG. 5 is a conceptual diagram showing a process of converting signals acquired by a plurality of sensors into signal waveforms in a frequency band after FFT conversion.

Since a sunlight signal detected by the RGB illuminance sensor is a DC component, it may be converted into a straight line with a frequency of 0 in a frequency band graph after FFT conversion, as shown in (a) of FIG. 5. In addition, since a RGB reflective light signal reflected on a human body and then received is detected as an AC component, it may be converted into a straight line having a specific frequency value after FFT conversion, as shown in (b) of FIG. 5.

Therefore, when an entire signal detected by the RGB illuminance sensor is FFT-converted, as shown in (c) of FIG. 5, a DC component associated with sunlight is removed and only an AC component of the RGB reflective light remains, which may be expressed as a linear waveform having a specific frequency. In this manner, only an RGB reflective light signal reflected on a user body part and then received may be extracted from an entire signal detected by the RGB illuminance sensor using a characteristic of a FFT algorithm.

Hereinafter, a method of arranging a plurality of RGB illuminance sensors provided in the signage display device 10 according to an embodiment of the present disclosure will be described in detail with various embodiments.

According to an embodiment of the present disclosure, a plurality of RGB illuminance sensors are preferably arranged in parallel to form a plurality of rows and columns in a horizontal direction or vertical direction between a plurality of signage display modules so as not to cover panels of the plurality of signage display modules provided in the display 100, but is not limited thereto.

Figure 6A:
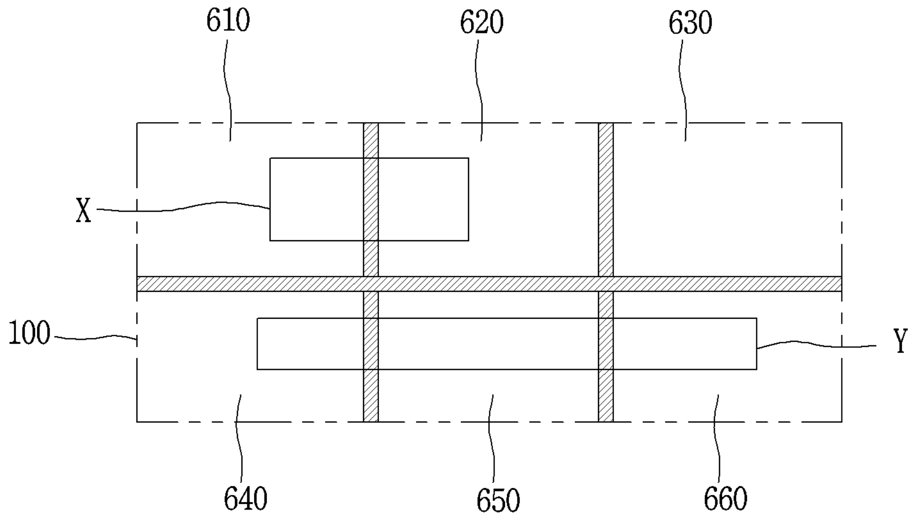
FIGS. 6A to 6C are conceptual diagrams showing an embodiment of arranging a plurality of sensors between display modules.
Figure 6A:
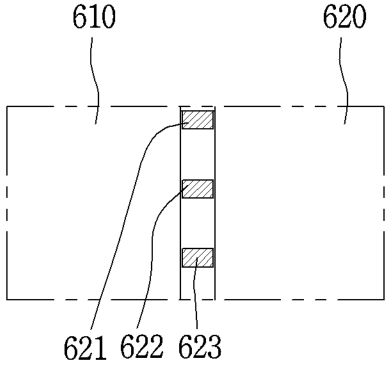
Figure 6A:
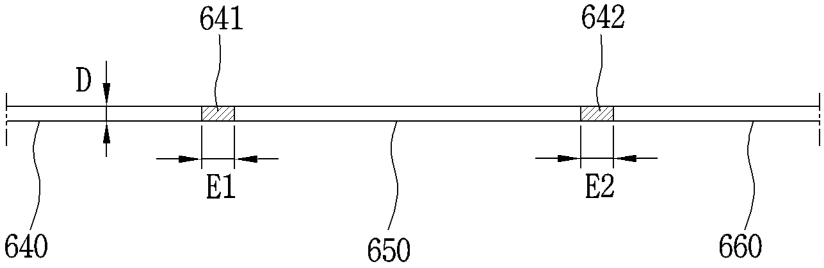

First, (a) of FIG. 6A shows an embodiment in which a plurality of RGB illuminance sensors are arranged in parallel between a plurality of signage display modules 610 to 660 provided in the display 100 to form grid-like lines inside the display 100.

In addition, although not shown, when the display 100 according to an embodiment of the present disclosure is aimed at a bezel-less design, a plurality of RGB illuminance sensors may be arranged in parallel to form one or more lines in a horizontal direction or a vertical direction or may be arranged only in a partial area of a line, but is not limited thereto.

Next, (b) of FIG. 6A, which is a conceptual diagram partially expanding area X shown in (a) of FIG. 6A, shows an embodiment in which a plurality of RGB illuminance sensors 621 to 623 are arranged in parallel to form a line in a vertical direction between the first and second signage display modules 610, 620.

Next, (c) of FIG. 6A is a front conceptual diagram showing a partial enlargement of area Y in (a) of FIG. 6A.

According to an embodiment of the present disclosure, a signage display unit module having a horizontal length of 1.2 m and a size of 55 inches, which is provided in the display 100, may be considered. In this case, when a thickness (D) of the display unit module is 0.44 mm, a gap area with a horizontal length E1, E2 of 1 mm may be generated between the modules when assembling the signage display modules. First and second RGB illuminance sensors 641, 642 according to an embodiment of the present disclosure may be respectively disposed in gap areas between a plurality of signage display modules 640 to 660.

Figure 6B:
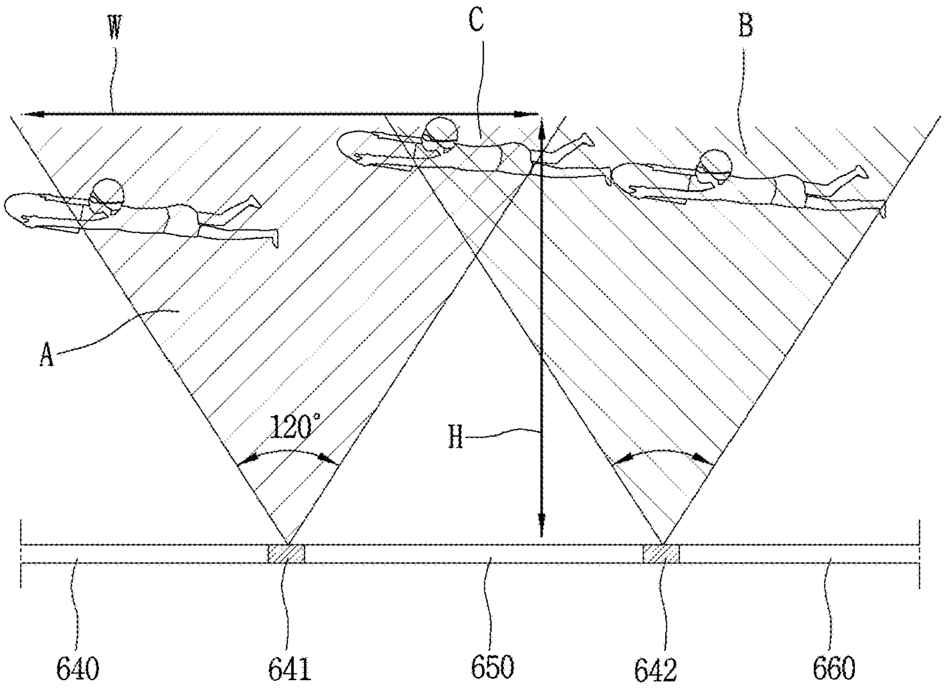

FIG. 6B shows a sensing area formed by the first and second RGB illuminance sensors 641, 642 when the first and second RGB illuminance sensors 641, 642 are arranged in the foregoing arrangement method.

According to an embodiment, when the first and second RGB illuminance sensors 641, 642 have a field of view (FoV) of 120 degrees, first and second sensing areas A+C, B+C having a horizontal length W of 1.7 m and a vertical length H of 1 m may be formed by the first and second RGB illuminance sensors 641, 642.

In this case, first and second RGB reflective lights are extracted from first and second signals detected by the first and second RGB illuminance sensors 641, 642, and when an intensity of at least one of the extracted first and second RGB reflective lights is greater than a first threshold, it may be determined that a user is located in the first or second sensing area (A to C). Next, the intensity of the first reflective light and the intensity of the second reflective light may be compared to determine which area among areas A, B, and C the user is located in.

According to an embodiment of the present disclosure, screen information associated with a user may be output to a signage display module disposed in a specific area of a swimming pool where the user is determined to be located using the foregoing method. An embodiment of outputting screen information associated with a user will be described in detail below with reference to FIG. 9.

Meanwhile, according to an embodiment of the present disclosure, when the intensity of at least one of the extracted first and second RGB reflective lights is greater than a second threshold, it is determined that there are a plurality of users in the first and second sensing areas, and a user density of the first and second sensing areas may be further calculated.

Figure 6C:
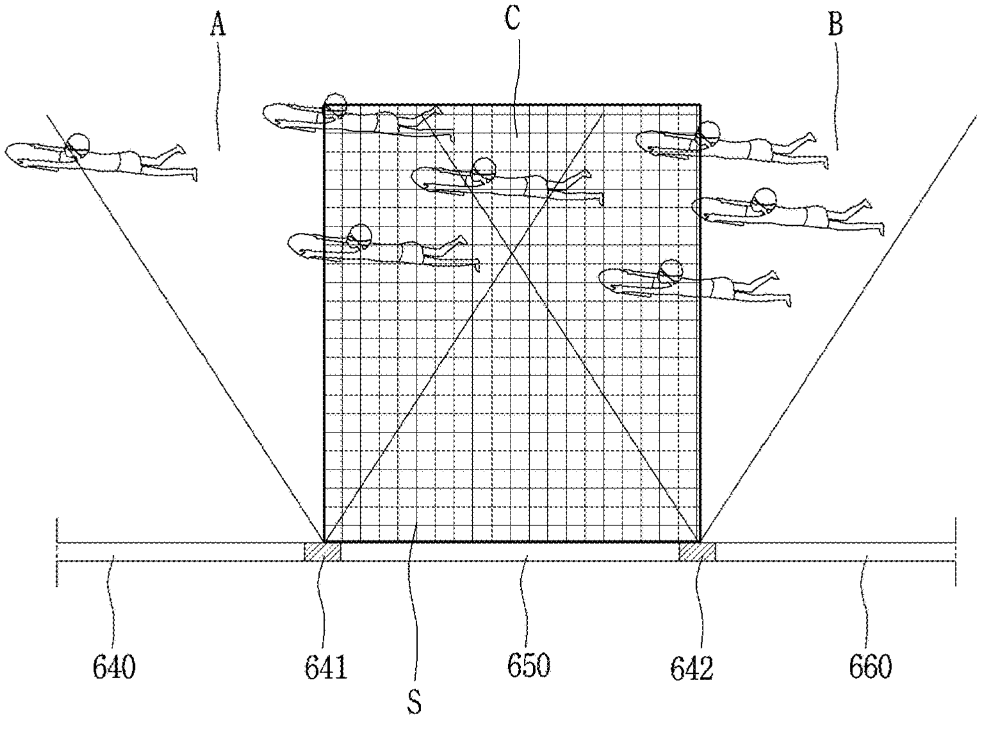

For example, referring to FIG. 6C, when multiple users are located in the first and second sensing areas, the intensity of at least one of the extracted first and second RGB reflective lights may be calculated to be a value greater than the second threshold. In this case, a user density of a swimming pool area S formed above a signage display module 650 located between the first and second RGB illuminance sensors 641, 642 may be calculated as an average value of the intensities of all RGB lights acquired and extracted by the first and second RGB illuminance sensors 641, 642, but is not limited thereto.

In addition, according to an embodiment, screen information associated with the calculated user density may be generated and output to the signage display module 650 associated with the first and second sensing areas. For example, when the user density is determined to be very high, screen information including a notification message regarding a swimming pool congestion may be generated and output. In addition, a guidance voice regarding the swimming pool congestion may be further generated and output to the audio output module 500 provided in the signage display device 10 of the present disclosure, but is not limited thereto.

Figure 7A:
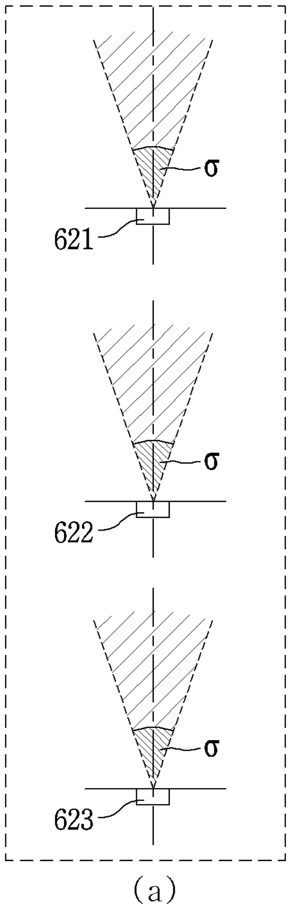
FIGS. 7A and 7B are conceptual diagrams showing an embodiment of arranging at least one sensor among a plurality of sensors at an angle with respect to a vertical direction of a display.
Figure 7A:
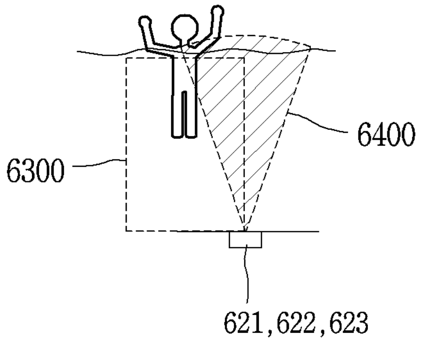

Next, (a) of FIG. 7A is a front conceptual diagram showing a plurality of RGB sensors 621 to 623 respectively arranged between a plurality of display modules 610, 620 shown in (b) of FIG. 6A. In addition, (b) of FIG. 7A is a conceptual diagram showing the plurality of RGB sensors 621 to 623 overlapping one another when looking at the drawing of (b) of FIG. 6A from the front.

As shown in (a) of FIG. 7A, when a plurality of RGB sensors 621 to 623 having a field of view (FoV) of o are all arranged in a vertical direction with respect to the display panel, a blind spot that is outside a sensing range sensed by the plurality of RGB sensors 621 to 623 may be generated. In this regard, the blind spot denotes an area that is not covered by a sensing range 6400 sensed by the plurality of RGB sensors 621 to 623 in an entire detection target area 6300 by the plurality of RGB sensors 621 to 623 arranged between the plurality of display modules.

Accordingly, in order to reduce the foregoing blind spot, the present disclosure illustrates a method of arranging at least one RGB illuminance sensor among a plurality of RGB illuminance sensors to be inclined from a vertical direction of the display panel.

Figure 7B:
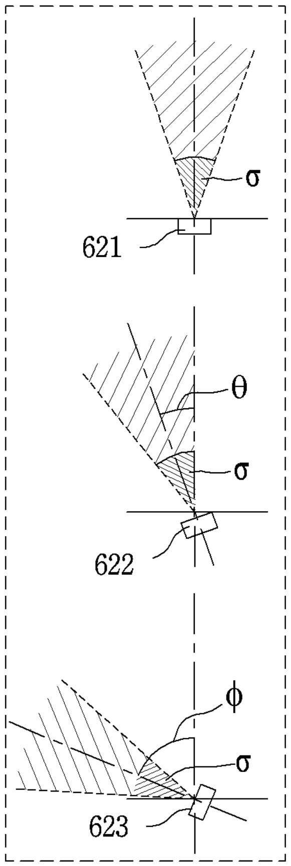
Figure 7B:
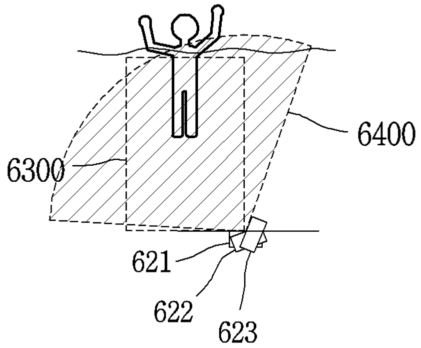

Referring to FIG. 7B, a plurality of RGB illuminance sensors 621 to 623 may be arranged so as not to generate a blind spot within a sensing range sensed by the plurality of RGB illuminance sensors 621 to 623.

Specifically, first, a field of view (FoV) of the plurality of RGB illuminance sensors 621 to 623 may be defined as o. In this case, among the plurality of RGB illuminance sensors 621 to 623, the first RGB illuminance sensor 621 may be arranged in a vertical direction of the display panel, the second RGB illuminance sensor 622 may be arranged to be inclined at a first inclination angle (θ) from the vertical direction of the display panel, and the third RGB illuminance sensor 623 may be arranged to be inclined at a second inclination angle (Φ) from the vertical direction of the display panel. In this case, as shown in (b) of FIG. 7B, the entire detection target area 6300 may be covered by at least one of the first to third sensing ranges by the first to third RGB illuminance sensors 621 to 623.

Figure 8A:
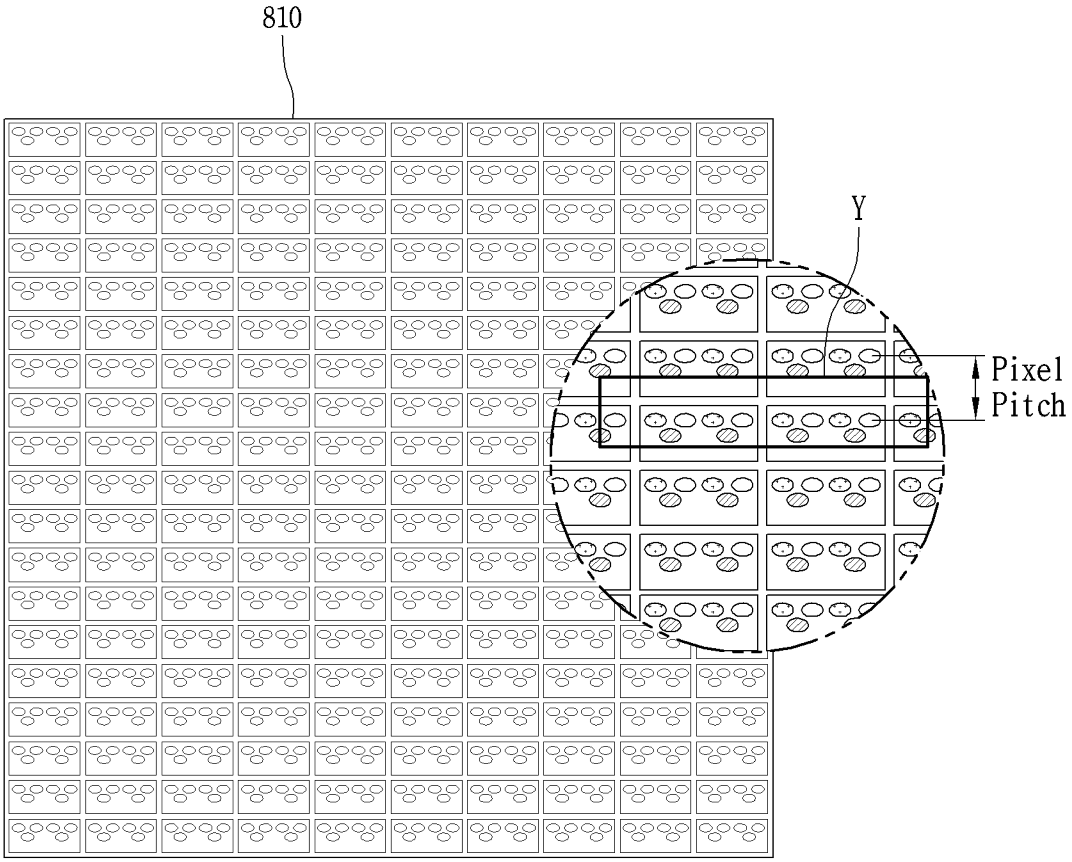
FIGS. 8A and 8B are conceptual diagrams showing an embodiment of arranging a plurality of sensors between panels within a display.
Figure 8B:
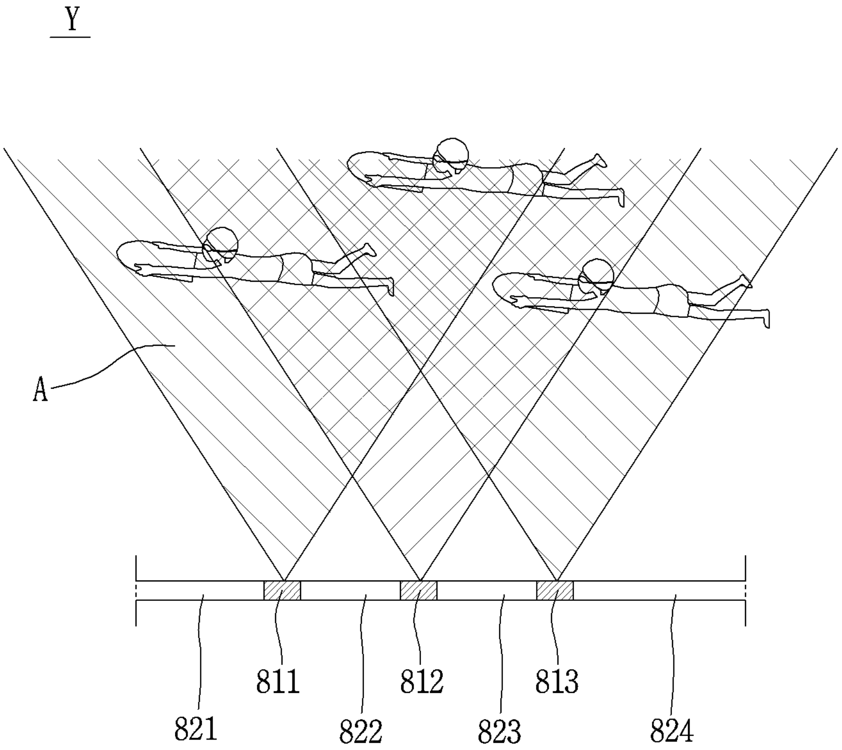

Referring to FIGS. 8A and 8B below, another embodiment will be described in which a plurality of RGB illuminance sensors are arranged between pixels within a display.

First, FIG. 8A shows an enlarged view of a signage display module provided in a display. According to an embodiment of the present disclosure, a signage display module 810 having a pixel pitch, which is a distance between pixels of the signage display module, of 1 mm may be considered.

Next, FIG. 8B is a front conceptual diagram showing a partial enlargement of area Y in (a) of FIG. 8A. According to an embodiment of the present disclosure, a plurality of RGB illuminance sensors 811 to 813 may be respectively arranged in parallel between a plurality of pixels 821 to 824 to form a grid-like lines inside a signage display module, but is not limited thereto.

In addition, although not shown, a plurality of RGB illuminance sensors may be arranged in parallel to form a plurality of lines in a horizontal direction or a vertical direction or may be arranged only in a partial area of a line inside a signage display module according to an embodiment, but is not limited thereto.

When a plurality of RGB illuminance sensors are disposed in the foregoing method, user detection may be made easier because a spacing between the RGB illuminance sensors becomes very narrow.

Referring again to FIG. 8B, when a sum of intensities of all RGB lights acquired and extracted by a plurality of RGB illuminance sensors 811 to 813 is greater than a first threshold at a predetermined level, it may be determined that one or more users are located in a swimming pool area where the plurality of RGB illuminance sensors 811 to 813 are disposed. In addition, screen information associated with a user may be generated and output to a signage display module in a swimming pool area where the user is determined to be located.

In addition, according to an embodiment of the present disclosure, when a sum of intensities of all RGB lights acquired and extracted by the plurality of RGB illuminance sensors 811 to 813 is greater than a second threshold, it may be determined that there are a plurality of users in a swimming pool area where the plurality of RGB illuminance sensors 811 to 813 are disposed. In this case, a user density of the swimming pool area may be further calculated to generate screen information including a guidance message associated with the calculated user density.

Meanwhile, a user density of a swimming pool area where the plurality of RGB illuminance sensors 811 to 813 are disposed may be calculated as an average value of the intensities of all RGB lights acquired and extracted by the plurality of RGB illuminance sensors 811 to 813, but is not limited thereto.

Hereinafter, an embodiment will be described in which different screen information is output based on a result of user detection on each of a plurality of signage display modules disposed on a bottom surface of a swimming pool.

Figure 9:
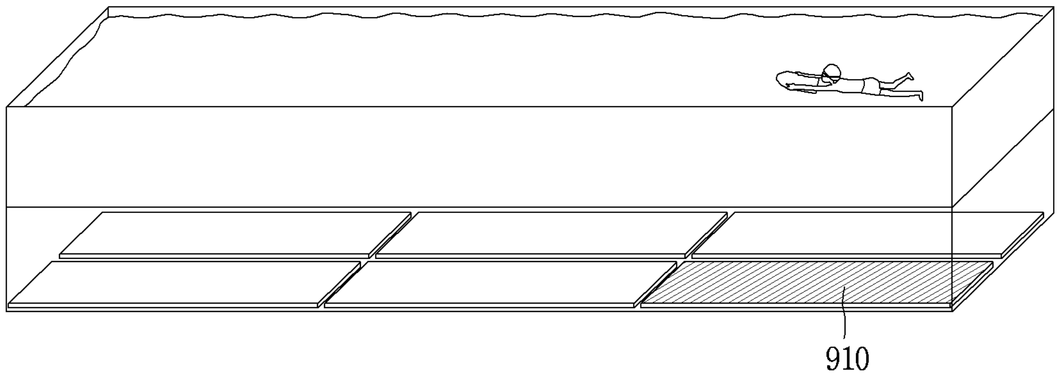
FIG. 9 is a conceptual diagram showing an embodiment of outputting different screen information to display modules corresponding to swimming pool areas where a user is located.
Figure 9:
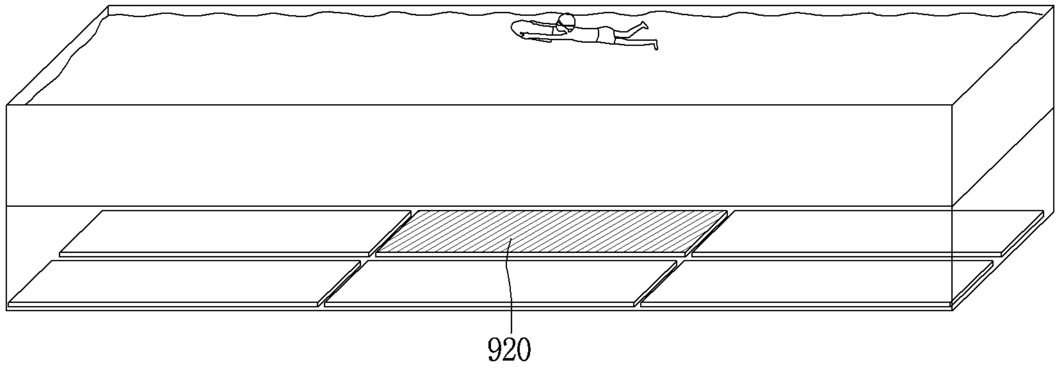
Figure 9:
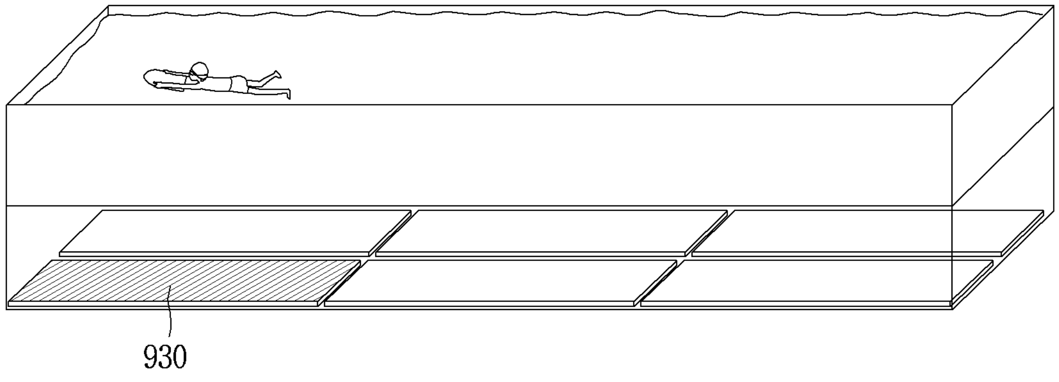

FIG. 9 shows an embodiment in which a screen output to a corresponding signage display module sequentially changes as a user located inside a swimming pool moves from a right area to a left area.

First, referring to (a) of FIG. 9, user-related signals may be acquired by a plurality of RGB illuminance sensors disposed adjacent to a first signage display module 910. Accordingly, it may be determined that a user is present above the first signage module 910 to generate and output a screen associated with the user. The screen associated with the user may include various reaction screens such as a welcome message or picture for the user, but is not limited thereto. pool area above a second signage display module 920, user-related signals may be acquired by a plurality of RGB illuminance sensors disposed adjacent to the second signage display module 920. Accordingly, it is determined that a user is present above the second signage display module 920 to output a screen associated with the user. In this case, the screen output to the second signage display module 920 may be a different screen from those output to other signage display modules, but is not limited thereto.

In this manner, as the user moves over the first to third display modules 910 to 930, a screen that changes sequentially may be output to a display module in a swimming pool area where the user is located. An interactive screen according to the user's movement may be provided in this manner, thereby having an effect of providing fun and enjoyment to users who use the swimming pool.

Figure 10:
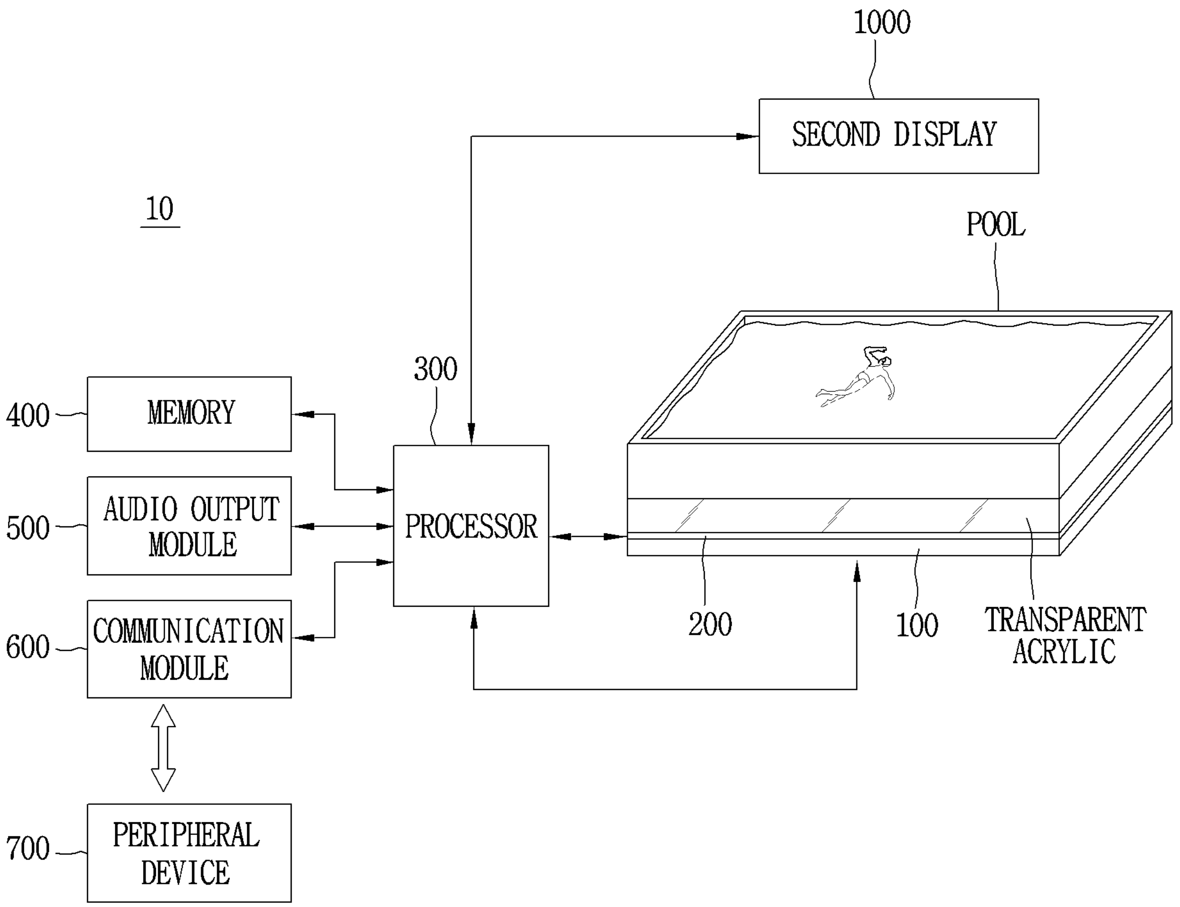
FIG. 10 is a conceptual diagram showing a configuration further including a second display in a signage display device according to one embodiment of the present disclosure.

A signage display device according to an embodiment of the present disclosure may further include a second display. As shown in FIG. 10, a second display 1000 may be disposed in a form of a rooftop signage display inside a swimming pool, but is not limited thereto.

In addition, a user-related screen information generated by a processor according to an embodiment of the present disclosure may be further output to the display 100 and the second display 1000, but is not limited thereto.

Hereinafter, a method of controlling a signage display device according to an embodiment of the present disclosure will be described in detail.

Figure 11:
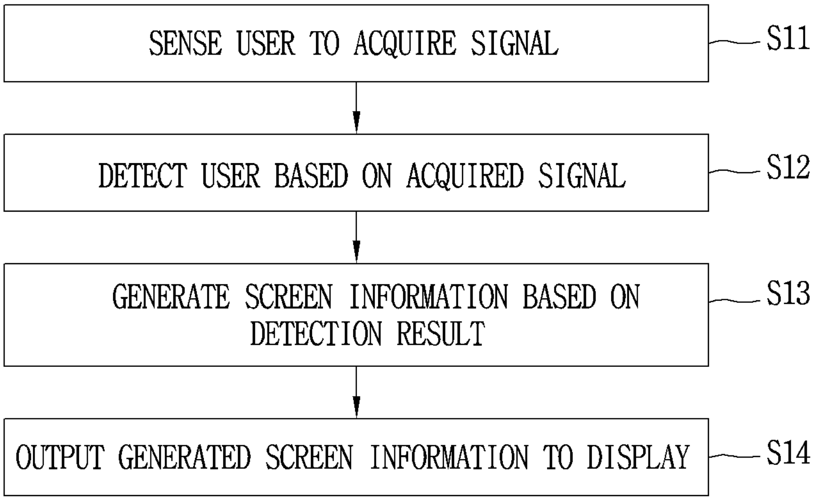
FIG. 11 is a flowchart showing a flow of a control method of a signage display device according to an embodiment of the present disclosure.

Referring to FIG. 11, a control method of an interaction swimming pool system according to an embodiment of the present disclosure may include sensing a user to acquire a signal (S11), detecting the user (S12), generating screen information (S13), and outputting to a display (S14).

The sensing of a user to acquire a signal (S11) may be performed by a plurality of RGB sensors provided in a signage display device according to an embodiment of the present disclosure. The plurality of RGB sensors may be arranged between signage display modules provided in the signage display device or arranged between pixels within the signage display module, but are not limited thereto.

Next, in the detecting of the user (S12), first removing a DC component associated with sunlight from first and second signals received from first and second sensors among a plurality of sensors to extract first and second RGB reflective lights reflected on a swimmer body part and then received may be performed. Next, detecting a user may be performed based on the intensities of the extracted first and second RGB reflective lights.

In addition, in the detecting of a user based on the intensities of the extracted first and second RGB reflective lights, when an intensity of at least one of the intensities of the extracted first and second reflective lights is above a predefined first threshold and below a second threshold, it may be determined that the user is in a sensing area of the first and second sensors. Next, when a user is determined to be present, the intensities of the extracted first and second reflective lights may be compared to determine a specific swimming pool area in which the user is located. Meanwhile, when an intensity of at least one of the extracted first and second reflective lights is above a second threshold, it may be determined that there are a plurality of users in the sensing area of the first and second sensors. Accordingly, a user density of a swimming pool area corresponding to the signage display module disposed between the first and second sensors may be calculated.

Next, in the generating of screen information (S13), screen information associated with a user may be generated based on location information of a swimming pool area where a swimmer is determined to be present and the user density. In addition, the screen information associated with the user may be generated differently depending on the user density of the swimming pool area corresponding to a plurality of signage display modules, but is not limited thereto.

The foregoing present disclosure may be implemented as computer-readable codes on a program-recorded medium. The computer-readable medium may include any type of recording device in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and also include a device implemented in the form of a carrier wave (for example, transmission via the Internet). The computer may include the controller of the terminal. The detailed description is therefore to be construed in all aspects as illustrative and not restrictive. The scope of the present disclosure should be determined by reasonable interpretation of the appended claims and all changes that come within the equivalent scope of the present disclosure are included in the scope of the present disclosure.

The invention claimed is:

1. A signage display device provided in an interactive swimming pool, the device comprising:

a display having a plurality of signage display modules;

a plurality of sensors that sense a user located in a swimming pool area formed above the signage display modules; and a processor that receives signals acquired by the plurality of sensors to detect a user located in the swimming pool area, wherein each of the plurality of sensors is an RGB illuminance sensor, wherein signals acquired and received by the plurality of sensors include sunlight emitted from the sun and an RGB reflective light, wherein the processor receives the signals acquired by the plurality of sensors, removes a DC component associated with the sunlight to extract the RGB reflective light reflected on a swimmer body part and then received, and detects a user based on an intensity of the extracted RGB reflective light, wherein each of the plurality of sensors is disposed between the plurality of signage display modules, wherein the processor receives first and second signals acquired by first and second sensors among the plurality of sensors to extract first and second RGB reflective lights, and detect a user based on intensities of the extracted first and second reflective lights, wherein the processor determines, when an intensity of at least one of the extracted first and second reflective lights is above a first threshold and below a second threshold, that the user is located in a sensing area of the first and second sensors, and compares intensities of the extracted first and second reflective lights to determine a first swimming pool area where the user is located, and wherein the first swimming pool area is at least one of swimming pool areas formed above one or more display modules arranged adjacent to the first and second sensors.

2. The device of claim 1, wherein the processor generates screen information associated with the detected user based on a result of the detection, and controls the generated screen information to be output to the signage display module.

3. The device of claim 1, wherein the processor generates screen information associated with the user that is output to a signage display module corresponding to the first swimming pool area, wherein the generated screen information is generated differently from screen information output to a signage display module corresponding to a second swimming pool area, and wherein the second swimming pool area is at least one area excluding the first swimming pool area in an entire swimming pool area.

4. The device of claim 1, wherein the processor determines, when an intensity of at least one of the extracted first and second reflective lights is above the second threshold, that there are a plurality of users in the sensing area of the first and second sensors, further calculates a user density of a swimming pool area formed above a signage display module disposed between the first and second sensors, and generates screen information to be output to the signage display module based on the calculated user density.

5. The device of claim 2, further comprising:

a communication module operatively coupled to the processor, wherein the processor controls the generated screen information to be transmitted to a peripheral device through the communication module, and wherein the peripheral device is at least one of electronic devices that control lighting, music, and waves within a swimming pool.

6. The device of claim 2, further comprising:

a second display, wherein the processor controls the generated swimming pool screen information to be output to the second display.

7. A signage display device provided in an interactive swimming pool, the device comprising:

a display having a plurality of signage display modules;

a plurality of sensors that sense a user located in a swimming pool area formed above the signage display modules; and a processor that receives signals acquired by the plurality of sensors to detect a user located in the swimming pool area, wherein each of the plurality of sensors is an RGB illuminance sensor, wherein signals acquired and received by the plurality of sensors include sunlight emitted from the sun and an RGB reflective light, wherein the processor receives the signals acquired by the plurality of sensors, removes a DC component associated with the sunlight to extract the RGB reflective light reflected on a swimmer body part and then received, and detects a user based on an intensity of the extracted RGB reflective light, wherein each of the plurality of sensors is disposed between pixels of the signage display module, wherein the processor extracts a RGB reflective light for each of a plurality of signals acquired by the plurality of sensors, and detects a user based on an intensity of the RGB reflective light extracted for each of the plurality of signals, and wherein the processor determines, when a sum of the intensities of the extracted RGB reflective lights is above a first threshold and below a second threshold, that a user is present in a swimming pool area formed above the signage display module, and generates screen information to be output to the signage display module based on a result of the determination.

8. The device of claim 7, wherein the processor determines, when the sum of the intensities of the extracted RGB reflective lights is above the second threshold, that there are a plurality of users in a swimming pool area formed above the signage display module to further calculate a user density of the swimming pool area, and generate screen information to be output to the signage display module based on the calculated user density.

9. A method of controlling a signage display device provided in an interactive swimming pool, the method comprising:

sensing a user located in a swimming pool area formed above a signage display module by a plurality of sensors to acquire a signal;

receiving the acquired signal to detect a user located in the swimming pool area;

generating screen information associated with the detected user based on a result of the detection; and outputting the generated screen information to the signage display module, wherein the receiving of the acquired signal to detect a user located in the swimming pool area comprises:

receiving first and second signals acquired by first and second sensors among the plurality of sensors;

removing a DC component associated with sunlight from the received first and second signals to extract first and second RGB reflective lights reflected on a swimmer body part and then received; and detecting a user based on intensities of the extracted first and second RGB reflective lights, and wherein the detecting of a user based on intensities of the extracted first and second RGB reflective lights comprises:

determining, when an intensity of at least one of the extracted first and second reflective lights is above a first threshold and below a second threshold, that the user is located in a sensing area of the first and second sensors, and comparing intensities of the extracted first and second reflective lights to determine a first swimming pool area where the user is located; and determining, when an intensity of at least one of the extracted first and second reflective lights is above the second threshold, that there are a plurality of users in the sensing area of the first and second sensors, and calculating a user density of a swimming pool area formed above a signage display module disposed between the first and second sensors.

* * * * *